April 29, 1958   FAUSTO CELORIO MENDOZA   2,832,679
GAS GENERATORS
Filed Dec. 19, 1955

INVENTOR
FAUSTO CELORIO MENDOZA
BY *Ogle P. Singleton*
ATTORNEY

United States Patent Office 2,832,679
Patented Apr. 29, 1958

2,832,679

GAS GENERATORS

Fausto Celorio Mendoza, Mexico City, Mexico

Application December 19, 1955, Serial No. 554,029

1 Claim. (Cl. 48—107)

My invention consists in a new and useful improvement in gas generators and is designed to provide an apparatus for producing a combustible gas from a liquid fuel such as coal oil. The particularly novel and useful feature of my improved apparatus is the combination of means for conducting the liquid fuel to a gasification chamber in which the fuel is gasified, a housing about said chamber, means for introducing streams of air into the housing, heating means for gasifying the fuel and heating the introduced air, and means to effect the desired mixture of the heated air and gasified fuel to produce the desired product of the apparatus.

While I illustrate in the drawing and hereinafter fully describe one specific embodiment of my invention, it is to be distinctly understood that I do not consider my invention to be limited to said embodiment but refer for its scope to the claim appended hereto.

Figure 1:
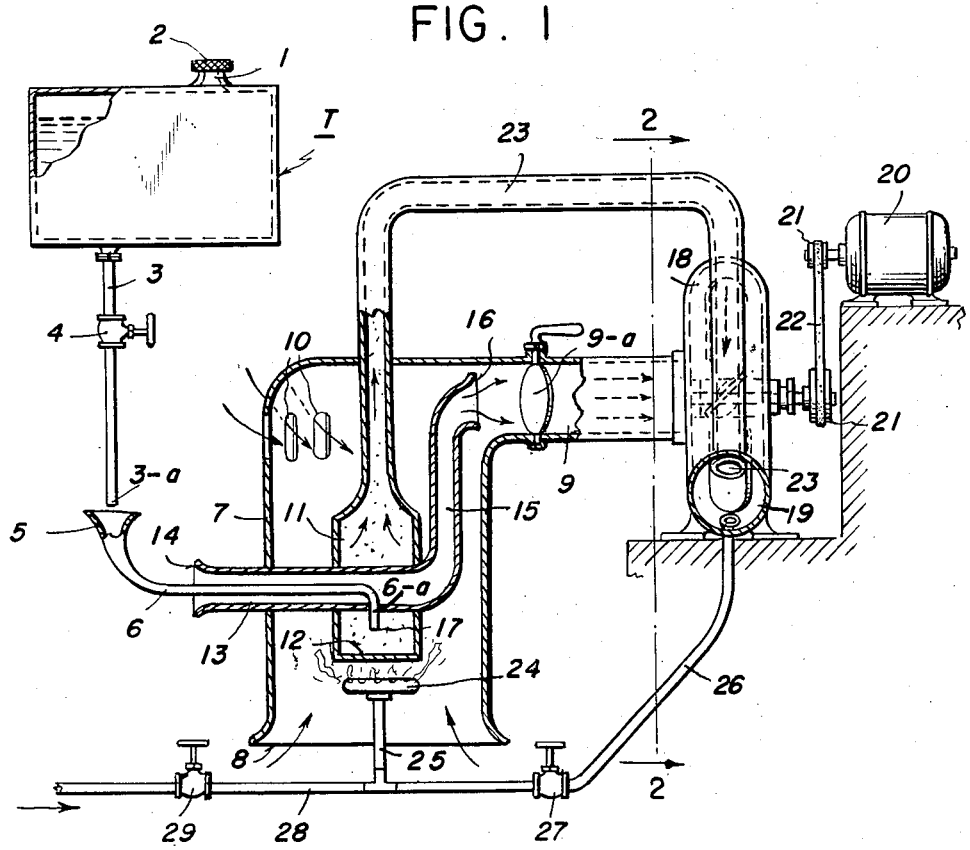
Fig. 1 is a longitudinal, vertical section of my improved apparatus.

As shown in the drawing, my apparatus has a supply tank T for the liquid fuel having an inlet opening 1 in its top with a cap 2 and a discharge pipe 3 in its bottom with a control valve 4. Suitably disposed below the lower open end 3-a of the pipe 3 there is a funnel 5 at the upper end of a fuel supply pipe 6. A suitable housing 7 has an air inlet, open bottom 8, an air discharge conduit 9 at its upper end, and a plurality of air inlet openings 10 in its upper portion. Suitably disposed in the housing 7 there is a fuel chamber 11 having a closed bottom 12. I provide an air conduit 13 having a flared inlet end 14 entering housing 7, passing through chamber 11 and having an upwardly extending portion 15 having a flared air discharge end 16 co-axial with the air conduit 9. The fuel supply 6 enters the air conduit 13 through its end 14, extends therein to the vertical axis of the fuel chamber 11 and has a downwardly turned portion 6-a which passes out of the conduit 13 and has its lower, open end 17 adjacent the bottom 12 of the chamber 11.

Suitably mounted adjacent the housing 7 there is a centrifugal blower 18 to the intake side of which is connected the air discharge conduit 9 with a butterfly valve 9-a. The discharge side of the blower 18 is connected to a mixing conduit 19 from which is supplied the product of the apparatus.

The blower 18 is actuated by any suitable means such as a motor 20 with pulleys 21 and belt 22.

The chamber 11 has a fuel discharge pipe 23 connected with the mixing conduit 19.

Suitably disposed below the bottom 12 of the chamber 11, in the housing 7 there is a suitable gas burner 24 having a gas supply pipe 25 to which is connected a supply pipe 26 connected to the mixing conduit 19 and having a control valve 27. A second gas supply pipe 28 connects the gas pipe 25 with any suitable source of gas supply (not shown) and has a control valve 29.

Having described the details of construction of my improved apparatus, I will now describe its operation. The tank T having been filled with the proper liquid fuel, such as fluid petroleum, and gas supplied to the burner 24 by pipes 25 and 28, the burner 24 is lighted and valve 4 in pipe 3 is manipulated to allow the proper flow, by gravity, of the liquid fuel which drips from tank T through pipe 3 and funnel 5 into pipe 6. The blower 18 is energized by the motor 20. It is obvious that the burner 24 heats the interior of the housing 7 and that blower 18 induces an upward flow of atmospheric air through open bottom 8 of the housing 7, and out of housing 7 through the conduit 9. This flow of air absorbs the heat and products of combustion of the burner 24, which heats the chamber 11. The liquid fuel is conducted by the pipe 6 into the chamber 11 and falls to the bottom 12 thereof which, being closely adjacent burner 24 is sufficiently heated to gasify the fuel fed thereto. The upward flow of the heated air in the housing 7 and the effect of the blower 18 induces a flow of atmospheric air into the flared inlet 14 and through conduit 13 in which is disposed the fuel supply pipe 6. It is obvious that the inwardly flowing atmospheric air in the conduit 13, being at a considerably lower temperature than the heated air in the housing 7, tends to prevent undue rise of temperature of the liquid fuel in the pipe 6 to prevent any gasification of the fuel prior to its delivery into the chamber 11. As this air in conduit 13 passes through the portion 15 of the conduit 13 it becomes heated as it flows from discharge 16 and into the conduit 9.

I provide the inlets 10 in the housing 7 to permit atmospheric air to be drawn therethrough, become heated in the upper part of the housing 7 and flow out through the conduit 9. The purpose of such air flow is to provide the additional quantity of heated air to the conduit 9 to produce the proper fuel mixture. I have found that if this additional quantity of heated air were to be supplied exclusively through the open bottom 8 of the housing 7 and the conduit 13, there would be such an exceedingly violent entrance through bottom 8 as to affect the proper operation of the burner 24.

It is obvious that the valve 9-a serves to control the flow of heated air through conduit 9 to the blower 18.

Figure 2:
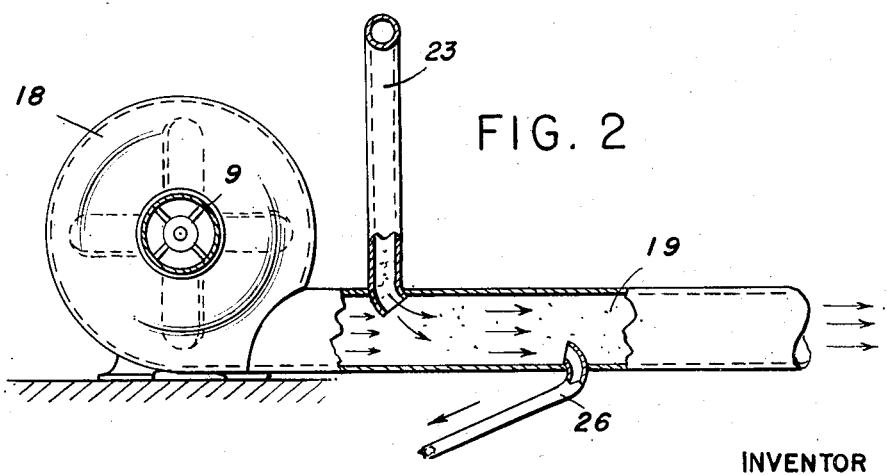
Fig. 2 is a transverse, vertical section on the line 2—2 of Fig. 1, in the direction of the arrows.

The gasified fuel in chamber 11 is induced to flow through the discharge pipe 23 into the mixing conduit 19 by the flow of the heated air from the blower 18 into the conduit 19. In the conduit 19 (Fig. 2) the heated air from the housing 7 and the gasified fuel from the chamber 11 are properly mixed to produce a combustible gas which may be supplied from the conduit 19 by any suitable means (not shown) as the product of my apparatus.

As the temperature of this product is relatively high it can be conducted, without condensation in the conduits, some distance. Hence one generator can feed simultaneously several installations in the same building, such as a bath room, laundry and kitchen.

It is obvious that, when the apparatus is in operation, proper manipulation of the valves 27 and 29 can effect the changeover to supply the burner 24 with combustible gas from the conduit 19.

Having described my invention, what I claim is:

In an apparatus for generating a combustible gas from a liquid fuel, the combination of a housing having an open bottom to provide an air inlet; an air discharge conduit extending from the upper end of said housing; a second air conduit entering said housing on one side and having a horizontal portion and a vertical portion ending adjacent the junction of said first air conduit and said housing; a chamber in said housing through which said second air conduit passes; a fuel pipe passing into said horizontal portion and downwardly out of said second air conduit in said chamber; a gas conduit leading out of the top of said chamber and through the top of said housing; a mixing conduit outside of said housing, with which said first air conduit and said gas conduit are connected, adapted to supply the product of the apparatus; a gas burner disposed in said housing below said chamber; a controlled pipe connecting said mixing conduit and said burner; and a second controlled pipe connected to said first controlled pipe and adapted to conduct gas from any suitable source of gas supply.

References Cited in the file of this patent

UNITED STATES PATENTS

| | | |
|---|---|---|
| 1,624,270 | Mathes | Apr. 12, 1927 |
| 2,122,704 | Welborn et al. | July 5, 1938 |
| 2,398,654 | Lubbock et al. | Apr. 16, 1946 |
| 2,661,054 | Hyatt et al. | Dec. 1, 1953 |
| 2,661,271 | Hyatt et al. | Dec. 1, 1953 |
| 2,749,223 | Harrington | June 5, 1956 |